(12) United States Patent
Ma et al.

(10) Patent No.: US 8,517,563 B2
(45) Date of Patent: Aug. 27, 2013

(54) IMAGE LENS STRUCTURE

(75) Inventors: Feng-Yang Ma, New Taipei (TW); Shao-Hung Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/444,803

(22) Filed: Apr. 11, 2012

(65) Prior Publication Data

US 2013/0063938 A1 Mar. 14, 2013

(30) Foreign Application Priority Data

Sep. 14, 2011 (TW) .................................. 100132944

(51) Int. Cl.
*F21V 33/00* (2006.01)
(52) U.S. Cl.
USPC .................. 362/228; 362/249.02; 362/311.02

(58) Field of Classification Search
USPC ................. 362/543, 544, 545, 228, 230, 231, 362/249.02, 311.02
See application file for complete search history.

(56) References Cited

U.S. PATENT DOCUMENTS

| 7,327,254 B2 * | 2/2008 | Chen ........................ 340/545.2 |
| 8,434,917 B2 * | 5/2013 | Lai .............................. 362/373 |
| 2011/0242810 A1 * | 10/2011 | Lopez Querol et al. . 362/249.02 |

\* cited by examiner

*Primary Examiner* — Laura Tso
(74) *Attorney, Agent, or Firm* — Altis Law Group, Inc.

(57) ABSTRACT

An image lens structure includes a lens module, a supplementary lamp, a light shield, and a lid. The lens module has an image lens that is surrounded by the supplementary lamp. The light shield is fixed to an inner portion of the supplementary lamp by engagement screws and springs. The image lens is surrounded by the light shield. The lid is disposed over the image lens. The light shield abuts the lid around the active area of the image lens, and is capable of moving with the orientation of the image lens. The light shield prevents dazzle resulting from the light generated by the supplementary lamp.

10 Claims, 4 Drawing Sheets

IMAGE LENS STRUCTURE

BACKGROUND

1. Technical Field

The invention is related to an image lens structure with a light shield, and particularly to an image lens structure capable of avoiding dazzle.

2. Description of Related Art

Modularized image lens modules are ubiquitous. They are found for example, in portable 3C electronic products, in cameras, and in monitoring systems. The main components of the image lens module include an image lens, an image sensor and circuit board. The range of images captured by the image lens module may be adjusted by modifying the design of the optical lenses. To achieve a clear image, supplementary light is required when the ambient light is not sufficient. In monitoring systems, the image lens module has a supplementary light device around the image lens to provide sufficient light directly on the target to be captured. However, if the image lens module has a spherical cover using translucent plastic as material, a part of the supplementary light provided by the light supplementary device around the image lens may be refracted in the spherical cover and enter the image lens to cause dazzling. Dazzling causes vagueness in images captured by the image lens module and makes the monitoring systems ineffective. The problem of dazzling must be solved to allow better performance of the image lens module.

BRIEF DESCRIPTION OF THE DRAWINGS

The components in the drawings are not necessarily drawn to scale, the emphasis instead being placed upon clearly illustrating the principles of an image lens structure. Moreover, in the drawings, like reference numerals designate corresponding parts throughout the several views.

DETAILED DESCRIPTION

The invention will be described with references to the accompanying diagrams.

Figure 1:
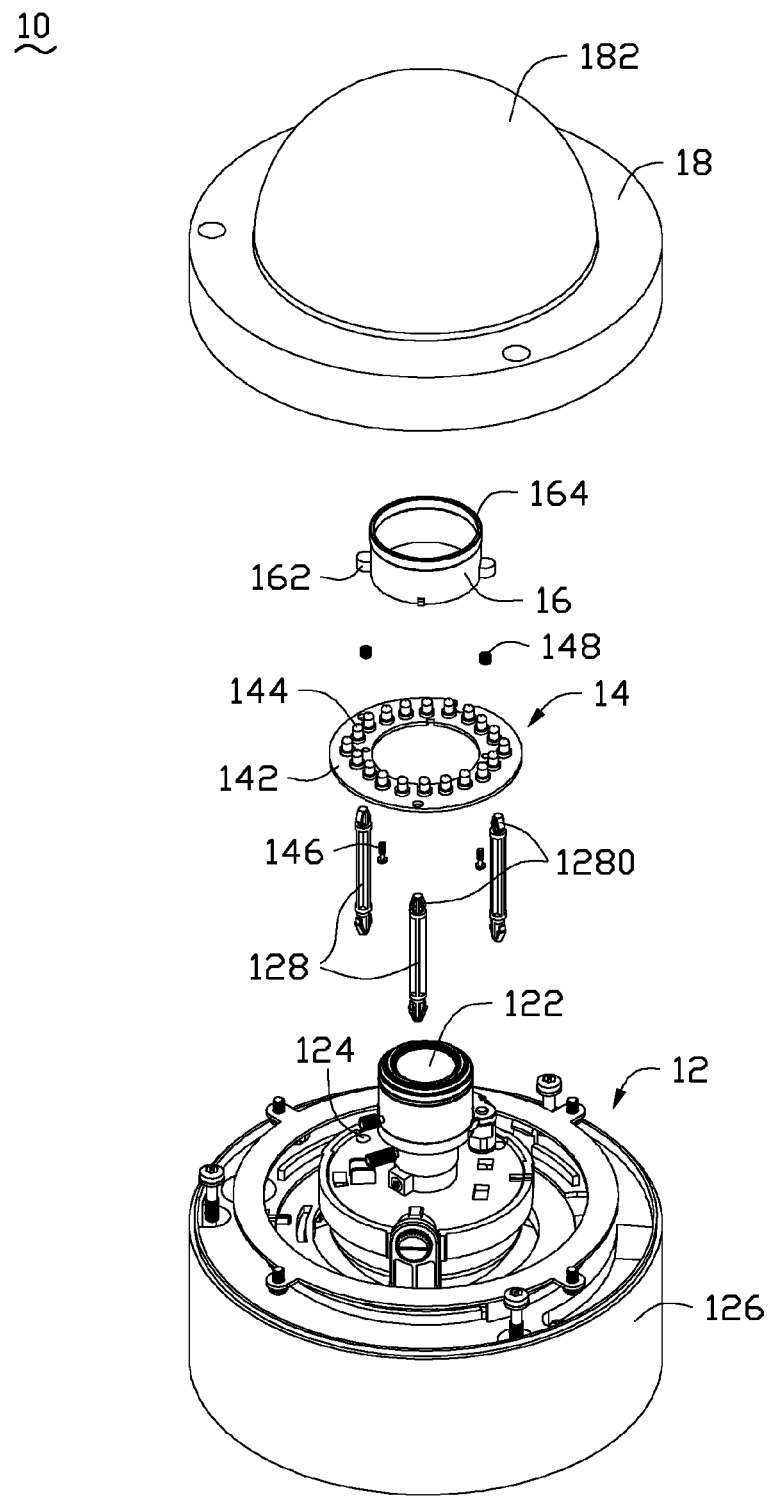
FIG. 1 illustrates the image lens structure of the disclosure.

FIG. 1 illustrates an image lens structure with light shield. The image lens structure 10 includes a lens module 12, a supplementary lamp 14, a light shield 16, and a cover 18.

The lens module 12 includes an image lens 122, an adjustable base 124, and a fixed base 126. The image lens 122 is disposed on the adjustable base 124, and the adjustable base 124 is disposed on the fixed base 126. The fixed base 126 may be fixed on a wall or on a ceiling. The adjustable base 124 may be rotated multiaxially on the fixed base 126. The rotation of the adjustable base 124 expands the monitoring region of the image lens 122. The supplementary lamp 14 provides sufficient light for the image lens 122 to capture images at night or in a dim environment. The supplementary lamp 14 is fixed by a plurality of supporting elements 128 arranged around the image lens 122. Therefore, the supplementary lamp 14 helps to provide sufficient light for the image lens 122 in the monitoring region.

Figure 2:
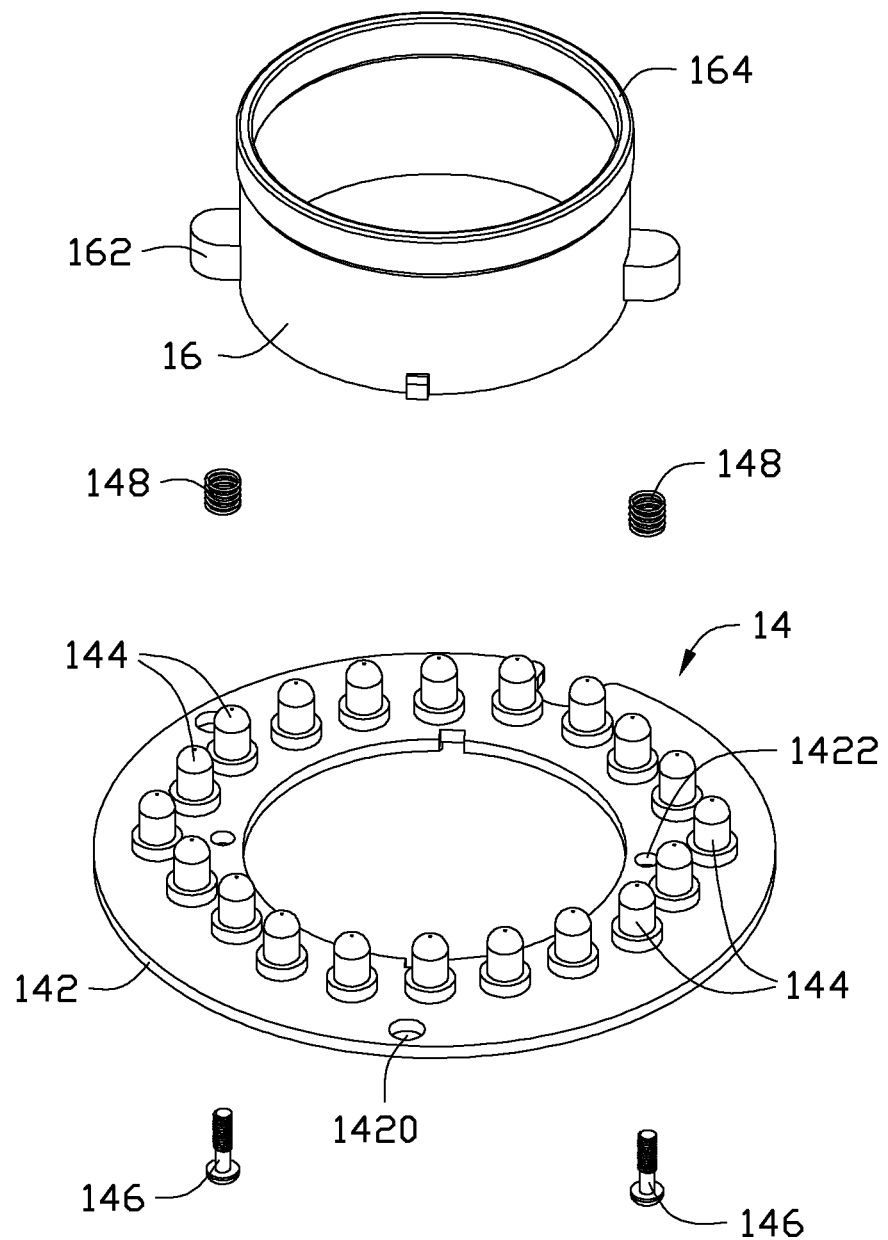
FIG. 2 illustrates the light shield and the supplementary lamp of the disclosure.
Figure 3:
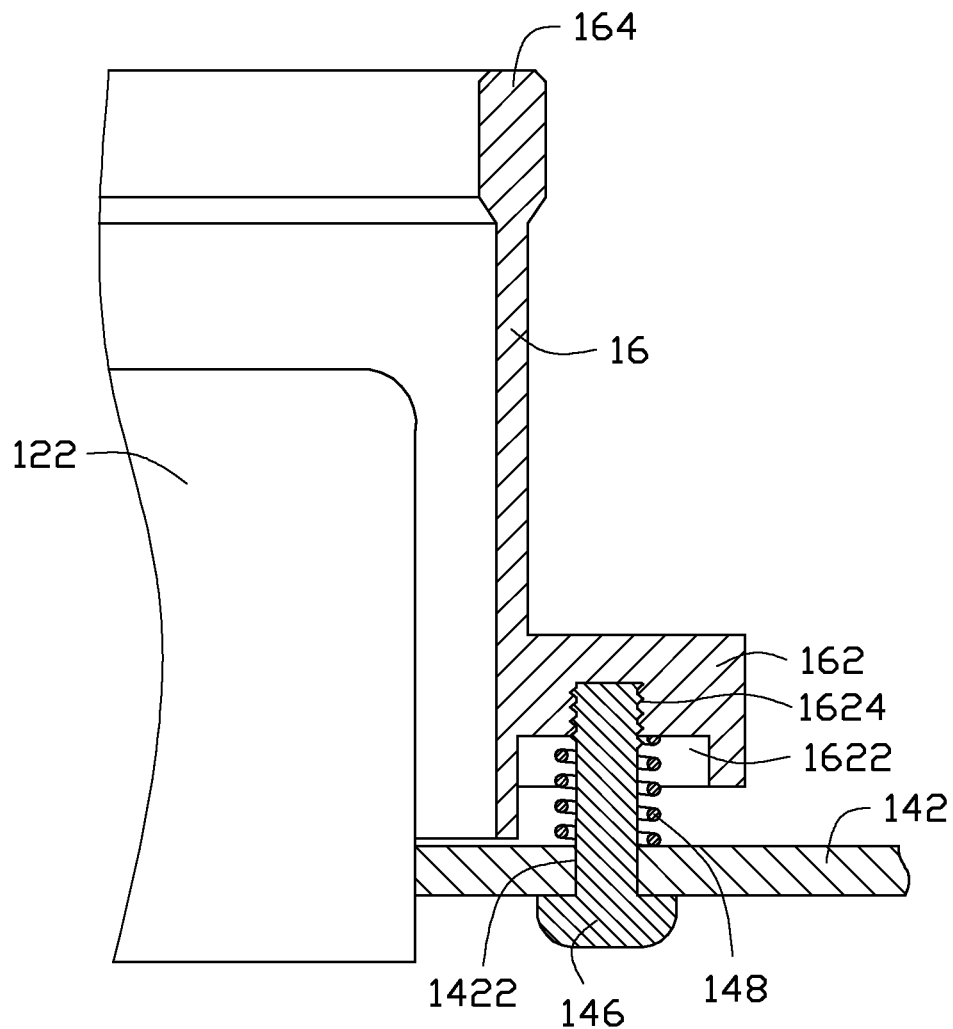
FIG. 3 is a cross-sectional view of the image lens structure of FIG. 1 illustrating the arrangement of the light shield and the circuit board.
Figure 4:
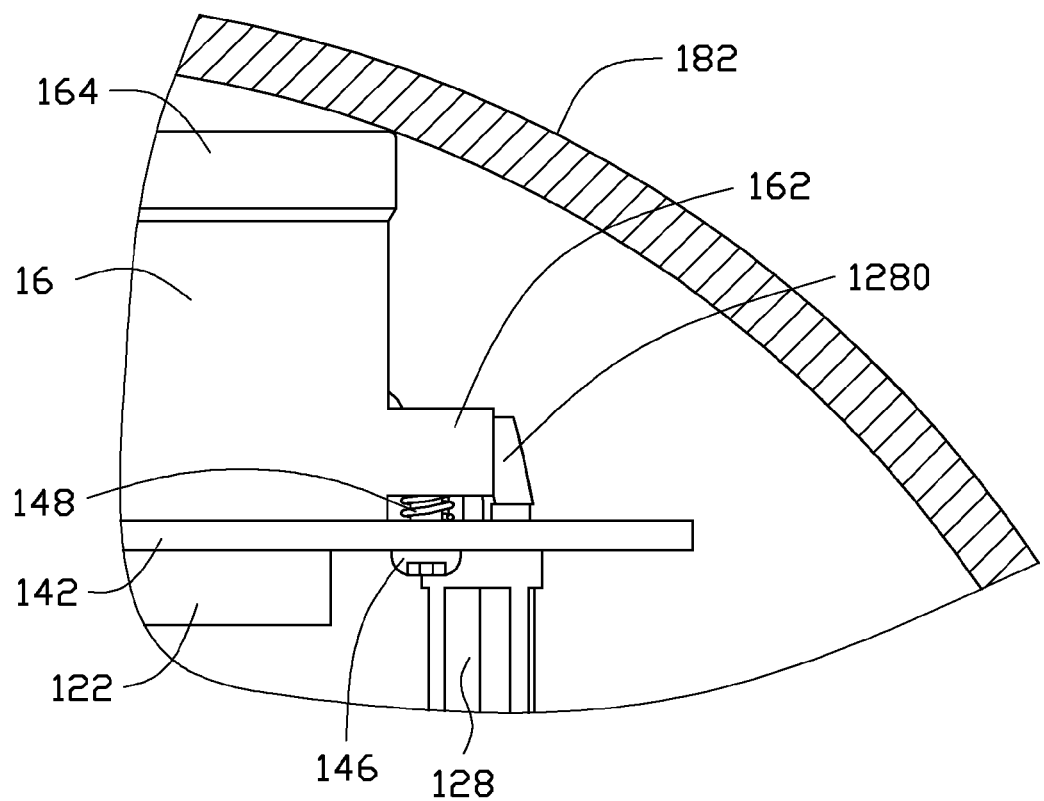
FIG. 4 is a cross-sectional view that illustrates the light shield of the image lens structure abutting a spherical cover.

The supplementary lamp 14 includes a circuit board 142 and at least one light emitting element 144. The light emitting element 144 is disposed on the circuit board 142 and electrically connected to the circuit board 142. In the present embodiment, the circuit board 142 is annular, and the light emitting element 144 is a plurality of light-emitting diodes (LEDs). The LEDs are arranged sequentially along the circuit board 142. The circuit board 142 has a plurality of threaded holes 1420 in an outer portion (as shown in FIG. 2). The threaded holes 1420 correspond to a plurality of threaded rods 1280 disposed at the ends of the supporting elements 128. The circuit board 142 is fixed by engaging the threaded rods 128 to the threaded holes 1420 on the circuit board 142. The distance from each threaded rod 1280 to the adjustable base 124 is equal; therefore, the circuit board 142 and the threaded rods 1280 of the supporting elements 128 are substantially in the same plane. The circuit board 142 is positioned to surround the image lens 122. The circuit board 142 has a plurality of holes 1422 (see FIG. 2) in an inner portion. Each hole 1422 and a spring 148 are engaged by an engagement screw 146 to fix the light shield 16. The light shield 16 is a hollow cylinder and is screwed to the inner portion of the circuit board 142. The light shield 16 is therefore placed to surround the image lens 122. The light shield 16 has at least two flanges 162. The flanges 162 are projected from an outer circumference of the light shield 16. Each flange 162 has a recess 1622 (see FIG. 3) at the bottom. Each spring 148 pierced by the engagement screw 146 is secured in the recess 1622 between the flange 162 and the circuit board 142 (as shown in FIG. 3). Each flange 162 has an engagement hole 1624 at a top of the flange 162 for fastening the engagement screw 146. Accordingly, the engagement of the engagement screws 146 in the engagement holes 1624 causes compression of the springs 148. The compression of the springs 148 urges the light shield 16 towards the lid 18 constantly, within the limits of movement of the engagement screw 146. The lid 18 is screwed to the fixed base 126 of the lens module 12. The lid 18 has a transparent spherical cover 182 at the top of the lid 18 to seal the image lens 122 and the supplementary lamp 14 against contaminants and damage. The light shield 16, placed between the image lens 122 and the supplementary lamp 14, has a thickened rim 164 on the top of the hollow cylinder, and the thickened rim 164 is positioned higher than the top of the image lens 122. The light shield 16 is constantly pushed away from the compressed spring 148, and accordingly, the thickened rim 164 of the light shield 16 is pushed tightly against an inner surface of the spherical cover 182 (see FIG. 4).

The thickened rim 164 of the light shield 16 is maintained in place against the inner surface of the spherical cover 182. In the present embodiment, the thickened rim 164 uses rubber as its material. The rubber material lends the thickened rim 164 some elasticity and keeps the thickened rim 164 tightly against the inner surface of the spherical cover 182. The light generated by the supplementary lamp 14 which passes through the spherical cover 182 and is refracted in the spherical cover 182 will not be able to enter the active area shielded by the light shield 16, and light generated by the supplementary lamp 14 which does strike the spherical cover 182 above the level of the thickened rim 164 will have such a high angle of incidence as to allow very little refraction into the active area. In addition, the light shield 16 has an elasticity that allows some movement instead of any distortion of the thickened rim 164, caused by the abuttal between the thickened rim 164 and the inner surface of the spherical cover 182, and the cylindrical shape of the thickened rim 164 is maintained. The region enclosed by the light shield 16 is the active area of the image lens 122 for capturing images. With the help of the light shield 16, the image lens 122 may capture images of good quality without the interference of disordered light from the supplementary lamp 14. The image lens structure 10 with the light shield 16 of the disclosure has the advantages of few components, ease of assembly, low cost, and good performance.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. An image lens structure comprising:
   a lens module, comprising an image lens;
   a supplementary lamp disposed to surround to the image lens;
   a light shield positioned to surround the image lens and screwed to an inner portion of the supplementary lamp; and
   a lid disposed over the lens module;
   wherein the light shield abuts the lid around an active area of the image lens.

2. The image lens structure of claim 1, wherein the lens module comprises a fixed base and an adjustable base disposed on the fixed base, and the image lens is disposed on the adjustable base.

3. The image lens structure of claim 2, wherein the adjustable base comprises a plurality of supporting elements and each supporting element comprises a threaded rod at its end, the distance from each threaded rod to the adjustable base being equal.

4. The image lens structure of claim 1, wherein the supplementary light comprises a circuit board and at least a light emitting element disposed on the circuit board, the light emitting element being electrically connected to the circuit board.

5. The image lens structure of claim 4, wherein the circuit board is annular, and the light emitting element comprises a plurality of light-emitting diodes (LEDs).

6. The image lens structure of claim 4, wherein the circuit board comprises a plurality of threaded holes disposed at an outer portion of the circuit board and a plurality of holes at an inner portion of the circuit board, the light shield being fixed by engaging a plurality of engagement screws with the springs and the holes.

7. The image lens structure of claim 4, wherein the light shield further comprises at least two flanges projected from an outer circumference the light shield, each flange having a recess disposed at a bottom of the flange and an engagement hole on a top of the flange.

8. The image lens structure of claim 7, wherein the springs are secured in the recesses between the flanges and the circuit board.

9. The image lens structure of claim 7, wherein the light shield comprises a hollow cylinder having a thickened rim which is positioned higher than the image lens, and a material of the thickened rim comprises rubber.

10. The image lens structure of claim 1, wherein the lid comprises a spherical cover at a top of the lid, and the spherical cover seals the image lens and the supplementary lamp.

\* \* \* \* \*